W. B. LOUTHAN.
PIN CUTTING AND SEPARATING MACHINE.
APPLICATION FILED APR. 4, 1908.
928,206.
Patented July 13, 1909.
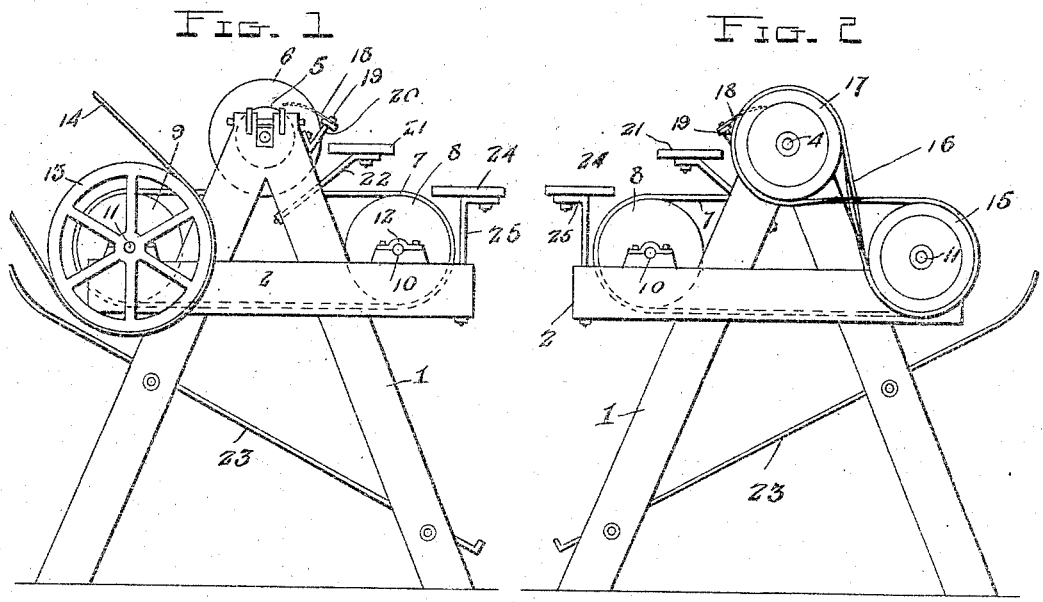
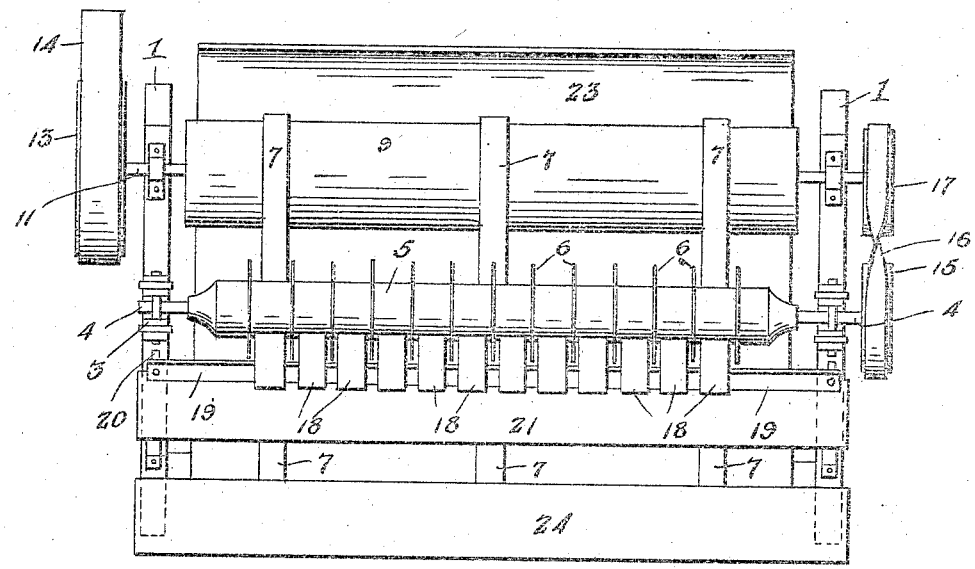
Witnesses
Inventor
William B. Louthan
By Watson E. Coleman
Attorney

UNITED STATES PATENT OFFICE.

WILLIAM B. LOUTHAN, OF EAST LIVERPOOL, OHIO.

PIN CUTTING AND SEPARATING MACHINE.

No. 928,206.            Specification of Letters Patent.            Patented July 13, 1909.

Application filed April 4, 1908. Serial No. 425,207.

*To all whom it may concern:*

Be it known that I, WILLIAM B. LOUTHAN, a citizen of the United States, residing at East Liverpool, in the county of Columbiana and State of Ohio, have invented certain new and useful Improvements in Pin Cutting and Separating Machines, of which the following is a specification, reference being had to the accompanying drawings.

My invention relates to improvements in machines for cutting and separating porcelain pins used by potters for spacing apart glazed pottery ware during the process of firing. In the manufacture of spacing pins of this character the clay is mixed to provide a tough plastic mass like putty which is forced through a steel die by a screw press or the like in order to produce strands of suitable length. A number of these strands which are usually of triangular shape in cross section are simultaneously formed and they are caught upon a board or other suitable support and then cut into desired lengths.

The object of my invention is to provide a simple and practical machine through which these pin boards may be passed and which will cut up the strips into pins and separate the perfect from the imperfect ones in a rapid and expeditious manner and without waste.

With the above and other objects in view, the invention consists of the novel features of construction and the combination and arrangement of parts hereinafter fully described and claimed and illustrated in the accompanying drawings, in which—

Figures 1 and 2 are end views of my improved pin cutting and separating machine; and Fig. 3 is a top plan view.

In the drawings 1 denotes a supporting frame which may be of any suitable form and construction but which preferably comprises two connected end pieces of inverted V-shape provided with horizontal beams 2.

Mounted in suitable bearings 3 at the top of the V-shaped end pieces or members is the shaft 4 of a knife drum 5. The latter is cylindrical and has suitably fixed to it a plurality of circular or disk-like rotary cutters or knives 6 which are suitably spaced apart according to the length of the pins to be cut by the machine.

Arranged upon the frame beneath the knives is an endless carrier adapted to receive the pin boards and to carry them through the machine and beneath the knives so that the latter will cut the plastic strips upon such boards. Said carrier preferably consists of two or more belts 7 passed around horizontally disposed drums or rollers 8, 9 fixed upon shafts 10, 11 journaled in suitable bearings 12 upon the horizontal beams 2 of the end pieces. The drum 8 is arranged at the front end of the frame and the drum 9 at its rear end; and upon one end of the shaft 11 of the rear drum is a pulley 13 to receive a driving belt 14. On the other end of the shaft 11 is a pulley 17 which is connected by a crossed belt 16 to a pulley 15 on one end of the knife shaft 4. By making the pulleys 15, 17 of the same size and employing the crossed belt it will be seen that the knives will be driven at the same speed as the carrier and that as they sever the plastic material the latter will adhere to them and be carried upwardly and forwardly.

For the purpose of removing from the knives the pins or pieces of plastic material cut by them I provide a plurality of deflecting plates or scrapers 18 one of which projects between each two adjacent knives. As illustrated, said scrapers are inclined upwardly and rearwardly and have their rear free ends projecting between the knives while their front and lower ends are suitably secured to a cross bar 19 supported at its ends by brackets 20 from the end pieces of the frame. The scrapers or deflectors 18 are so disposed that pins carried upwardly and forwardly between the knives 6 will be engaged and loosened by them and will drop upon a pin board or upon any other suitable catching plate or receptacle placed upon a rack 21. While the latter may be a support of any description it preferably comprises a horizontally disposed board arranged above the carrier and in advance of and beneath the deflectors or scrapers 18 and supported by brackets 22 projecting from the end pieces of the frame.

The pin boards passing through the machine drop upon the elevated rear portion of a downwardly and forwardly inclined chute 23 which conveys them by gravity to the front of the machine. This chute 23 is secured between the end pieces or members of the frame and may be of any suitable form and construction.

24 denotes a rack or support similar to the rack 21 and consisting of a board mounted on brackets 25 secured to the forward ends of the horizontal beams 2 so that said board is disposed at the extreme front of the machine and in advance of the working stretch of the endless carrier. Said rack or support 24 is adapted to support the pin boards before they are placed upon the carrier and passed through the machine, so that the operator may remove any imperfect strands upon the boards.

In operation, a pin board containing one or more strands of plastic material to be cut into spacing pins, is first placed upon the rack 24 so that the operator may straighten out the strands upon it and remove any imperfect ones. The machine is then started and the pin board is lifted from the rack 24 and placed upon the endless carrier consisting of the belts 7. The latter move the board rearwardly beneath the knives which sever the strips into short pieces or pins and carry them upwardly and forwardly to the deflectors or scrapers 18 which loosen them from the knives or cutters and discharge them upon an empty pin board placed on the rack 21. The ends of the strands that are too short to reach to the next knife will not be picked up by the knives but will remain upon the board and will be discharged together with the latter into the chute 23. These scraps may be collected at the front end of the chute and thrown into a scrap box.

It will be seen that by means of the machine pins may be very rapidly cut and separated and that they will be perfect in form. Consequently, there will be little or no waste of the material from which they are made.

While I have shown and described my invention as especially adapted for cutting and separating the porcelain spacing pins used by potters and others I wish it understood that my invention my be used for analogous purpose and that various changes in the form, proportion and minor details of construction may be resorted to without departing from the spirit or sacrificing any of the advantages of the invention.

Having thus described my invention what I claim is:

1. A machine of the character described comprising a frame having two inverted V-shaped end pieces, longitudinal side bars secured to said end pieces, a knife shaft journaled in bearings at the tops of the end pieces of the frame, a plurality of rotary disk knives upon said shaft, front and rear rollers journaled in bearings upon the projecting ends of the longitudinal side bars, endless belts uniting said rollers and forming an endless carrier beneath the knives, deflector or scraper plates arranged in advance of the disk knives and projecting between the same, an elevated support arranged in advance of and beneath said deflector or scraper plates and a downwardly and forwardly inclined chute arranged beneath the endless carrier and secured to the diverging legs of said end pieces, substantially as described.

2. A machine of the character described comprising a frame, a knife shaft, a plurality of rotary disk knives upon the latter, front and rear rollers journaled in the frame, endless belts between said rollers and disposed beneath the knives to provide an endless carrier, deflectors or scrapers projecting between the knives, a support beneath and in front of said deflectors or scrapers, and means for rotating the knife shaft and said rollers.

3. A machine of the character described comprising a frame, a knife shaft, a plurality of rotary disk knives upon the latter, front and rear rollers journaled in the frame, endless belts between said rollers and disposed beneath the knives to provide an endless carrier, deflectors or scrapers projecting between the knives, a support beneath and in front of said deflectors or scrapers, a downwardly and forwardly inclined chute beneath the carrier, means for imparting motion to one of said rollers and means for rotating the knife shaft from one of said rollers.

4. A machine of the character described comprising a frame, a knife shaft, a plurality of rotary disk knives upon the latter, front and rear rollers journaled in the frame, endless belts between said rollers and disposed beneath the knives to provide an endless carrier, deflectors or scrapers projecting between the knives, a support beneath and in front of said deflectors or scrapers, a downwardly and forwardly inclined chute beneath the carrier, means for rotating the shaft of one of the rollers of the carrier, pulleys upon the last mentioned shaft and said knife shaft, a crossed belt connecting said pulleys, and a support upon the front of the frame in advance of said carrier.

5. A machine of the character described comprising a frame, a horizontal shaft journaled in stationary bearings upon the frame, a plurality of rotary disk knives upon the shaft, an endless carrier arranged in the frame beneath the knife shaft, a stationary support upon the frame in front of said knife shaft and provided with a plurality of deflectors or scrapers to project between the disk knives and remove the material cut by and adhering to the same, and a supporting shelf arranged in front of and beneath said deflectors or scrapers and adapted to receive the cut material from the same.

6. A machine of the character described comprising a frame, a horizontal knife shaft journaled in stationary bearings on said frame, a plurality of rotary disk knives upon said shaft, a horizontally disposed endless carrier arranged in the frame beneath the knife shaft, a horizontal supporting shelf carried by the frame and arranged at the front end of said carrier, a downwardly and forwardly inclined chute arranged in the frame beneath the carrier, the rear end of said chute projecting beyond the rear end of the carrier and adapted to receive the discharge therefrom, a horizontal support arranged on the frame in front of the knife shaft and provided with a plurality of deflectors or scrapers projecting between said knives and adapted to remove the material cut by and adhering to them, and a horizontal supporting shelf arranged above the endless carrier in front of the knife shaft and in front of and beneath said deflectors or scrapers to receive the material passing from the same.

In testimony whereof I hereunto affix my signature in the presence of two witnesses.

WILLIAM B. LOUTHAN.

Witnesses:
M. J. McGarry,
Edna McHenry.